United States Patent [19]

Karlsson

[11] Patent Number: 4,766,308
[45] Date of Patent: Aug. 23, 1988

[54] OPTICAL SCANNER WITH REFRACTIVE MATERIAL POSITIONED ON INNER REFLECTIVE FACETS

[75] Inventor: Lars Karlsson, Täby, Sweden
[73] Assignee: Pharos AB, Stockholm, Sweden
[21] Appl. No.: 943,214
[22] PCT Filed: Mar. 11, 1986
[86] PCT No.: PCT/SE86/00104
§ 371 Date: Nov. 24, 1986
§ 102(e) Date: Nov. 24, 1986
[87] PCT Pub. No.: WO86/05597
PCT Pub. Date: Sep. 25, 1986

[30] Foreign Application Priority Data

Mar. 22, 1985 [SE] Sweden ............... 8501429

[51] Int. Cl.$^4$ ................... G02B 26/08; H01J 3/14
[52] U.S. Cl. ..................... 250/236; 350/6.8
[58] Field of Search ............. 350/6.5, 6.6, 6.7, 6.8, 350/6.9, 286, 424, 6.4; 250/236, 235, 234; 356/380, 386, 387; 358/205, 206, 208, 199

[56] References Cited

U.S. PATENT DOCUMENTS 3,614,194 10/1971 Harris ................... 358/205
3,619,027 11/1971 Baker et al. ............ 350/6
3,828,124 8/1974 Baum ................... 358/205
3,884,548 5/1975 Linder ................. 350/286
4,019,804 4/1977 Collier ................ 250/236
4,475,787 10/1984 Starkweather .......... 350/6.5

FOREIGN PATENT DOCUMENTS 429070 6/1948 Italy ................. 350/6.7
53-36247 4/1978 Japan .

Primary Examiner—David C. Nelms
Assistant Examiner—Michael Messinger
Attorney, Agent, or Firm—Pollock, Vande Sande & Priddy

[57] ABSTRACT

Scanner arrangement which incorporates at least one rotatable unit (15) provided with one or more reflecting facets (16) positioned in the beam path of the scanner arrangement so as to deflect the beam path during a scan. Reflection against the facets takes place within a material (17) having a refractive index greater than 1. The scanning facet against which reflection takes place appears to change from the aspect of the beam path within the material, whereas a transition surface between the material and air appears to be stationary from the aspect of the beam path, or at least moves in space irregularly with movement of the scanning facet.

4 Claims, 3 Drawing Sheets

OPTICAL SCANNER WITH REFRACTIVE MATERIAL POSITIONED ON INNER REFLECTIVE FACETS

FIELD OF THE INVENTION

The present invention relates to an optical scanner arrangement, and particularly one which includes at least one rotatable unit provided with at least one mirror surface.

BACKGROUND OF THE INVENTION

In optical scanning systems of the kind in which the scanning elements used either have the form of rotating mirror polygons, or oscillation mirrors, it is desirable (a) to reduce dimensions to the greatest possible extent, so as to reduce inertia during oscillatory motion of the mirrors, (b) to reduce as far as possible rotational or oscillatory speeds, and (c) to achieve a scanning rate which is convertible with the line sweep of a conventional television system. In the case of these two latter conditions, it is attempted, when using rotating facet-polygons to place the greatest possible number of mirroring facets around the periphery of the drum, since television systems have a relatively high line frequency. Unfortunately, it is not possible to include as many facets as might be desired since efficiency decreases with increasing numbers of facets and since the performance of the scanning arrangement or device will fall. A factor of merit in respect of an optical scanner, e.g., for a line scan, is the optical invariant E. The optical invariant is a system constant which at the exit pupil of the scanner can be expressed as $E = \emptyset \times \alpha$, where $\emptyset$ is the aperture of the scanner arrangement, i.e., the factor determining the cross-section of the beam passed through the system, and $\alpha$ is the field angle of the scan. The formula for calculating invariance is applicable only when the object scanned is located in air (n=1). In the case of intermediate imaging in the system, the expression takes the form $E = u \times L \times n$, where L is the length of the line scan, u is the aperture angle at the intermediate image, and n is the refractive index of the medium where imaging takes place. Expressed more simply, it is possible, for example, in the case of a scanner constructed for infrared light with a given invariant E, to exchange thermal sensitivity for geometric resolution and vice versa, i.e., the following relationship prevails: E~element per line/NETD, where NETD is the so-called Noise Equivalent Temperature Difference, which is a measurement of the responsiveness or sensitivity of the system.

This means that, with a given, specific optical invariant in respect of an optical scanning system, it is always necessary to compromise between image resolution and sensitivity. On the other hand, an increase in the optical invariant heightens the possibility of improving both of these properties. Consequently, attempts are made to improve the optical invariant, in order to thus improve the performance of the system.

When, for example, a line scan is effected with the aid of a rotating drum provided with mirroring facets around its periphery, such as to form a mirror polygon, it can be shown that the following relationship prevails in air upon reflection against the drum:

$$E \approx \frac{4\pi^2 D\eta}{N^2} (1 - \eta)$$

where D is the drum diameter, N is the number of facets present, and $\eta$ is the scan efficiency, i.e., the relationship between the useful part of the line scan over a facet and the whole scan over the facet. It will be seen from this that the invariant decreases with the square of the number of facets provided. This decrease of the invariant is unfavorable, due to the desirability of incorporating as large a number of facets as possible, as mentioned above. Performance should therefore be increased in one way or another, in order to compensate for the unfavorable effect created by a large number of facets.

By permitting the scanning function to take place through reflection within a refractive material, it is possible to increase performance by a factor corresponding to the refractive index of said material, in comparison with corresponding scanning devices with reflection in air, i.e., $$E \approx \frac{4\pi^2 D\eta}{N^2} n(1 - \eta)$$

where n is the refractive index of the refractive material. For example, when germanium is used the gain is a factor of 4, while the gain afforded by silicon is a factor of 3.4. Other materials of high refractive index capable of providing an improved result are also to be found, such as cadmium telluride with $n \approx 2.7$ or zinc selenide with $n \approx 2.4$.

The above discussion has been made in respect of an optical scanning device in the form of a rotating drum provided with mirroring or reflecting facets. A similar discussion can also be made, however, in respect of an optical scanning device in the form of an oscillating mirror.

SUMMARY OF THE INVENTION

A particular feature of the present invention is that reflection against scanning reflective surfaces is effected in a material whose refractive index is greater than 1; and that the scanning surfaces are inclined at an angle to an imaginary optical axis of the stationary part of the scanner arrangement, the magnitude of this angle varying differently in time to a corresponding angle included by one or more transition surfaces between beam passage in air and beam passage in the material of higher refractive index.

BRIEF DESCRIPTION OF THE DRAWINGS

The invention will now be described in more detail with reference to the accompanying drawings, in which FIG. 1a illustrates a first embodiment of a component incorporated in a scanner arrangement according to the invention, while

DESCRIPTION OF PREFERRED EMBODIMENT

Figure 1A:
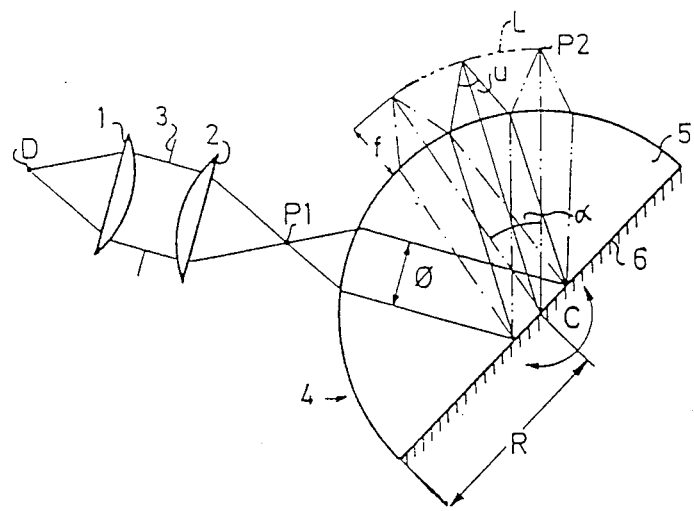

FIG. 1a illustrates that part of a first embodiment of an optical scanner arrangement according to the invention essential to the invention, incorporating an oscillation mirror, which in this embodiment is inserted in a nonparallel beam path. For the sake of illustration and ease of description, the beam path is described as emanating from the detector D, which is placed at the end of the beam path remote from the subject, even though the beam path per se travels in the opposite direction. Located upstream of the detector D, as seen in the beam direction, is a relay optics, or lens-system, which comprises, in conventional fashion, two lenses 1 and 2 having therebetween a substantially parallel beam path, and a diaphragm 3 which is placed in the parallel beam path in order to make a field stop for the radiation from the scanned subject, which is thus effected very close to the detector. The use of other types of relay optics or lens-systems is also conceivable, such as, for example, a relay optic of the Cassegrain-type. The detector D is imaged by the relay optic in a stationary point P1. Located in the beam path on the side of the point P1 opposite to the detector D is an optical component 4 according to a first embodiment of the invention. The component 4 includes a substantially semi-cylindrical or hemispherical body 5 made of a transparent material having a high refractive index. The rearwardly located side of the body 5 is planar and has mirroring or reflective coating 6 applied thereto. The unit 4 is mounted in its entirety on the shaft of a drive motor (not shown), so that it can be oscillated backwards and forwards about its center C.

In this embodiment, the divergence of the radiation through the point P1 is adapted so that the beam path is parallel within the body 5, and the component 4 is so placed in the beam path that the point C lies on the optical axis of the beam path. Subsequent to reflection against the reflective surface 6, the beam is again focused on the point P2. Because the component 4 swings backwards and forwards about the point C, the point P2 will move backwards and forwards along the line L. The length of L is linearly dependent on the radius of the body 5, while the aperture angle u is inversely proportional to this radius.

The optical invariant will be:

$$E \approx L \times u \approx \alpha(R+f)\frac{\phi}{f} = \frac{\alpha\left(R+\frac{R}{n_5-1}\right)\phi}{\frac{R}{n_5-1}} \supset n_5 \phi\alpha$$

where L is the distance travelled by the point P2 during a scan, u is the aperture angle, $\alpha$ is twice the scan angle of the mirror, R is the radius of the body 5, f is the inverse of the refractive power of the surface of the body 5, i.e., in the case illustrated in FIG. 1a the distance between the surface of the body 5 and the line L, $\phi$ is the aperture, $n_5$ is the refractive index of the material in the body 5.

Figure 1B:
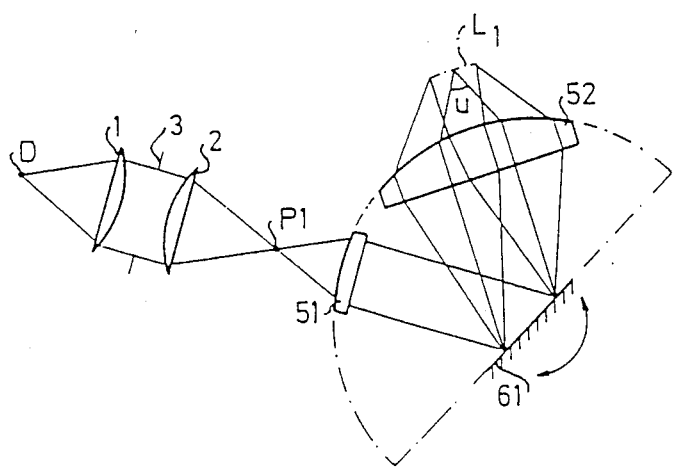
FIG. 1b shows an analogous prior art arrangement.

In order to emphasize the difference between a conventional scanner arrangement and the scanner arrangement according to the invention, there is shown in FIG. 1b a scanner arrangement which, while being equivalent to that shown in FIG. 1a, lacks the features of the arrangement according to the invention, i.e., the scanner arrangement illustrated in FIG. 1b incorporates an oscillation mirror 61 where reflection takes place in air, and in which two lenses 51 and 52 are inserted in the beam path in the same location as that occupied by the transition surface of the body 5 in the embodiment of FIG. 1a. The oscillation mirror 61 is placed in the same location as that occupied by the reflective surface 6 in FIG. 1a and is oscillated through the same scan angle. The apertures $\phi$, the aperture angle u and the focal length f have been selected equivalent to corresponding magnitudes $\phi$, u and f of the embodiment of FIG. 1a.

$$E \approx L \times u \approx \alpha f \frac{\phi}{f} = \phi\alpha$$

It follows from this that a factor of $n_5$ is gained, when reflection at the point where the actual scan is effected is permitted to take place in a material having a refractive index of $n_5$.

It should be noted that the vergence at the scanning component lacks significance. The important factors, and the ones determining performance, are the diameter $\phi$ of the light beam at the scanning surface, the scan angle $\alpha/2$ and the refractive index $n_5$.

Figure 2A:
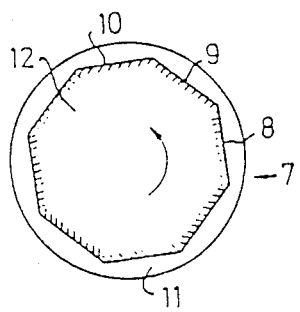
FIGS. 2a and 2b illustrate a second embodiment of a scanner arrangement according to the invention.

FIG. 2 is a schematic cross-sectional view of a rotatable scanner component 7, which can be incorporated as the active component in a scanner arrangement, in a manner similar to the component 4 in FIG. 1. The component 7 includes a polygon having a plurality of reflecting or mirroring facets 8, 9, 10, etc., which may be planar or curved depending on the dimensions and positions allotted to the remaining scanner components. The outer surfaces of respective facets 8, 9, 10 . . . have applied thereon a layer 11 of material which is transparent to the type of radiation for which the scanner is intended. This material has a refractive index which is greater than 1, and which is preferably as high as possible. One suitable material is germanium. The outer configuration of the component 7 may be cylindrical or spherical, depending on the manner in which the component co-acts with remaining scanner components. In this embodiment, the layer 11 functions as a lens placed in the direct vicinity of each reflecting facet. The component illustrated in FIG. 2a functions as a positive, optical beam-splitting component in the beam path, and hence at least either the beam impinging on the facet or the beam emergent therefrom is non-parallel.

A component of the kind illustrated in FIG. 2a can, in principle, be manufactured in two ways:

(a) The reflecting or mirroring facets 8, 9, 10 . . . may be mounted on a solid body 12 which is made, for example, of aluminum, and which may be integral with the rotational shaft of the rotor used to rotate the component 7. The layer 11 is applied to the body 12, for example by vapor deposition, as the body 12 rotates. The body 7 is then given the desired external contour, for example by machining the body in a so-called diamond lathe.

(b) A body 11 is molded from a transparent material. The inner surfaces, where the facets 8, 9, 10 . . . are to be placed, are worked to precise measurements and to a high surface finish. A coating of reflecting or mirroring material is then applied to the inner surface of the body 11, e.g., by vapor deposition. The thus treated, finished body 7 is mounted centrally on one end of the shaft of a rotor used to rotate the component when the scanner is in operation.

Figure 2B:
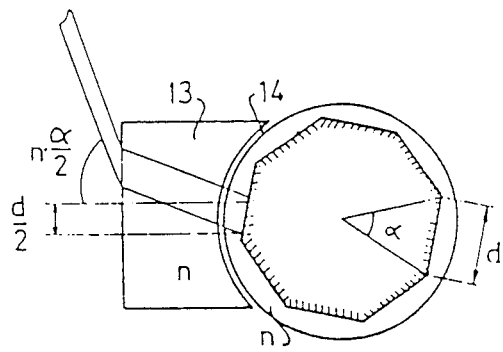

The component 7 illustrated in FIG. 2a can also be placed in a scanner with parallel beam path, provided that a block is placed in front of the component 7, such as the block 13 illustrated in FIG. 2b. The side of the block 13 facing the component 7 has a shape which corresponds to the outer shape of said component, and is placed so as to present a narrow gap between the block 13 and the component 7. The side of the block 13 remote from the component is planar. The effect of the transparent material of relatively high refractive index is illustrated very clearly in FIG. 2b, which shows the component 7 in a position immediately prior to facet transition. In this embodiment the extent of the sweep or scan has been chosen at 50%. The facet which reflects the radiation is shown to lie at an angle at which the incident radiation is deflected through $\alpha/2$ degrees. As a result of the diffraction in the surface of the block 13 remote from the component 7 at the transition to air, there is obtained a beam path which is deflected arcsine n.sin $\alpha/2 \approx$ n.$\alpha/2$, where n is the refractive index of the material.

Figure 3:
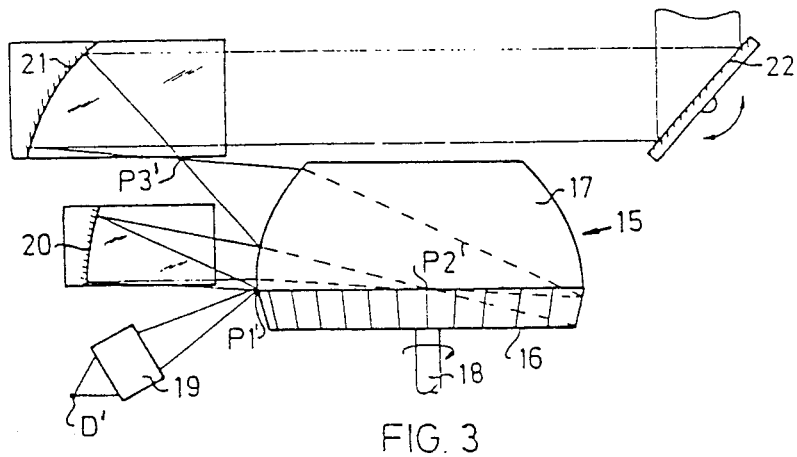
FIG. 3 illustrates a third embodiment of a component incorporated in a scanner arrangement according to the invention, inserted in an optical image scanner.

FIG. 3 illustrates a third embodiment of the scanning arrangement according to the invention which incorporates an active scanning component in the form of a mirrored drum 15 embodying a large number of facets. Of the embodiments illustrated, this embodiment is the one most preferred. The drum or component 15 is provided on its lower part, as seen in the Figure, with a row of reflecting facets 16, which are mirrored on both sides, so as to be able to reflect radiation on both their inner and their outer surfaces. These reflecting facets 16 may have the form of coatings applied to a body 17 made of a material which is transparent to the radiation to be detected and having a high refractive index, such as germanium, silicon, cadmium telluride. The part of the body 17 located above the facets 16 is a solid of revolution, and has its center on the axis of rotation 18. The component 15 is rotated by a motor (not shown). In the illustrated embodiment, the facets 16 are inclined at an angle to the axis of rotation.

An image of the detector D' is focussed on the point P1' by the relay optics 19 close to the outside of a facet 16, so that the facet area impinged upon by the radiation reflected by the facet and passed to the detector is small in relation to the surface area of the facet. The point P1' is focussed on a point P2' within the body 17 by a concave, approximatively spherical mirror 20 which is placed outside the component 15 and which is so dimensioned in relation to the mirrored body that the beam cone which impinges on the inner surface of a facet located opposite that impinged upon by the radiation nearest the detector D' practically completely fills the surface of the facet, at least in the direction of rotation, and accompanies the facet during its rotation. Subsequent to reflection against the facet, the radiation is focussed on a point P3' externally of the component 15. The point P3' moves through approximately part of a circle during rotation of the drum. The peripheral surface of the body 17 is substantially concentric with this part-circle or arc.

A further concave, substantially spherical mirror 21 makes the beam path parallel. Arranged in a pupil, through which the beam path passes during a scan, is a conventional oscillation mirror 22. The component 15 executes a line scan and the oscillation mirror 22 executes an image scan on an image of a remote subject aligned with the scanning arrangememt.

The afore-described embodiments of the scanning arrangement according to the invention incorporate an active scanner component having separately provided thereon a part which comprises a transparent material of high refractive index, and the stationary light-diffracting components of the scanner arrangement have been placed in air. The invention is not restricted to such an arrangement, however, since the whole of the scanner arrangement can comprise a material having a refractive index which is greater than 1. The principle according to the invention can be applied on existing scanner systems, so as to substantially improve performance of such systems without changing essentially the mutual position and configuration of the mirrored components incorporated by the system. This can be achieved because the beam path within an optical scanning system incorporating solely reflecting elements follows the laws of reflection and can be fully copied from a system in vacuum, air or some other gas, onto a system in which the medium located between the reflecting components has a high refractive index. The beam path is not changed until reaching the transition from refractive material to air, e.g., so that the field angle increases with a sustained aperture.

Figure 4:
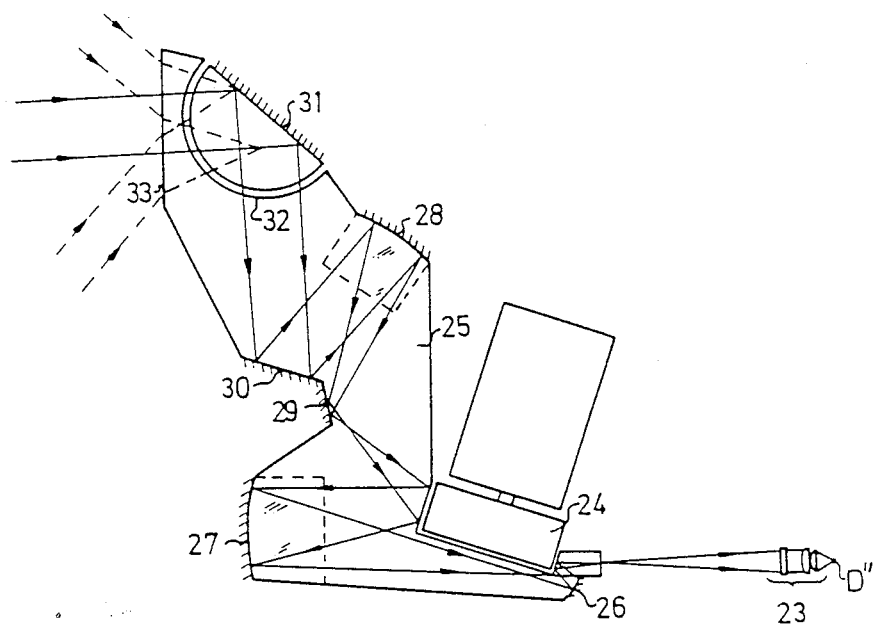
FIG. 4 illustrates a fourth embodiment of a scanner arrangement according to the invention.

FIG. 4 illustrates an embodiment in which the whole of the scanner arrangement, with the exception of the detector D'' and the relay optics 23 in front of the detector, are included in a material that is transparent to the light intended and has a refractive index greater than 1. A rotatable cylindrical drum 24 provided with reflecting facets and having approximately the cross-section illustrated in FIG. 2a is inserted in a cylindrical recess, which conforms to the outer shape of the drum and which is formed in a solid, homogeneous body 25 of transparent material. A narrow gap is formed between the mirrored-drum 24 and the body 25.

The external dimensions of the body 25 are adapted to the beam path in the scanner arrangement, and the reflecting elements therein, such as the three concave, curved mirrors 26, 27, 28, which function as positive optical elements in the beam path, and the two planar mirrors 29 and 30, which solely deflect the beam path, are formed by applying reflecting, or mirroring, coatings to finely-polished, accurately formed parts of the surface of the body 25. An oscillation mirror 31 of substantially the same construction as the component 4 in the FIG. 1 embodiment is placed in a recess in the body 25 conforming to the external contour of the mirror, in a manner to define a narrow gap between the elements 31 and 25.

The scanner arrangement illustrated in FIG. 4 operates with facet-tracking, and comprises a rotating facet-drum or polygon mirror for line scans, curved mirrors for returning the light beam to the polygon mirror, and an oscillation mirror for image deflection, substantially in accordance with the system illustrated in FIG. 9 of Swedish Patent No. 8201306-1. The planar mirrors 29, 30 serve solely to deflect the beam path, so as to obtain in practice an instrument which, while functioning in accordance with the principle illustrated in the above mentioned patent, also fulfills mechanical requirements with regard to accessibility, construction, compactness and manageability, thereby to facilitate the handling of the actual instrument itself. FIG. 4 is included for the sole purpose of illustrating that the whole principle of the present invention can be applied to existing types of optical scanner arrangements, and hence this figure will not be described in detail. The important feature of the invention is that light is refracted particularly in the entrance opening 33, so that the scan angle of the whole system will thereby increase with a factor of n, where n is equal to the refractive index of the material in the body 25.

In order to avoid, however, total reflection in the unavoidable transitions through air in the gaps between the body 25 and the elements 24 and 31 in the embodiment illustrated in FIG. 4, there should be chosen in respect of the body a material which has a relatively moderate refractive index. Consequently, germanium cannot be used readily in applications such as those illustrated in FIG. 4, unless particular attention is paid to this facet when aligning the beam path at these transitions. It is also conceivable, however, to permit the transitions to take place in a liquid having a relatively high refractive index. Germanium is nevertheless an expensive material, which is a further reason for its unsuitability when manufacturing the body 25, which is of relatively large size in applications such as these. Many other materials, possibly more suitable for the present purpose, are to be found, however, such as zinc selenide where $n \approx 2.4$, cadmium telluride where $n \approx 2.7$, and so on.

Many modifications are possible within the scope of the invention. For example, the body 17 of the FIG. 3 embodiment may be extend beneath the annulus of facets 16, and may be incorporated in a scanner arrangement in which there is more than one reflection against the inner surfaces of the facets. It will be understood that the outer surfaces of the facets 16 may have an outer part of transparent refractive material, so that the drum or polygon has an external appearance equal to that illustrated in FIG. 2a.

I claim:

1. An optical scanner arrangement which comprises a stationary optical system and at least one rotatable unit (15) provided with at least one scanning reflecting surface placed in a beam path of said scanner arrangement, wherein (a) said at least one scanning reflecting surface is positioned so that said beam path upon reflection thereagainst passes through a material having a refractive index greater than 1 and provided in contact with said at least one scanning reflecting surface, wherein, during one scan, said scanning reflecting surface rotates so that the angle formed thereby with an optical axis of a stationary part of said scanner arrangement varies;

(b) said material having a retractive index greater than 1 has a curved outer transition surface of such a shape that said beam path passes through said transition surface at a transition point, which point, during one scan, moves along said transition surface along a path concentric with the rotational axis (18) of said rotatable unit and at least substantially parallel with a path along which an image point for radiation is arranged to travel during a scan and lying in a plane normal to said rotational axis so that said transition surface acts as a stationary part belonging to said optical system;

(c) said rotating unit being formed as a rotatable drum provided with an annulus comprising a plurality of reflecting facets (16) as a scanning component, a detector (D') having a relay optics (19) which generates an image (1') of said detector in the vicinity of one of said facets, and at least on e concave mirror (20, 21) located externally of the mirrored drum;

(d) said facets (16) being reflective on both the inner and outer surfaces; and (e) a body (17) made of material which is transparent to the radiation in question being positioned so as to adjoin the inner surfaces of said facets (16) and being curved outwardly from the side of the facet annulus, at least on one side thereof.

2. A scanner according to claim 1, wherein said at least one rotatable unit (7; 24; 39) is placed in rotational symmetrical close proximity with a stationary unit (13; 25) comprising material with a refractive index greater than 1.

3. A scanner arrangement according to claim 2, wherein a second transition surface (33) between the stationary unit and air is placed close to the lens of said scanner arrangement.

4. A scanner according to claim 1, wherein the reflection against said mirrored drum obtained nearest said detector (D') is effected against said outer surfaces of said facets (16); and wherein said at least one concave mirror (20) placed nearest said detector (D') in the beam path together with said transparent body is so dimensioned and positioned that the beam path upon reflection against the inner surface of said facet (16) lying opposite the facet against which reflection is obtained nearest said detector takes place substantially fills out said facet, at least in its rotational direction, and accompanies said facet during its rotation through one scan.

* * * * *